United States Patent
Zhou et al.

(10) Patent No.: US 10,880,109 B2
(45) Date of Patent: Dec. 29, 2020

(54) FORWARDING MULTICAST DATA PACKET

(71) Applicant: NEW H3C TECHNOLOGIES CO., LTD., Zhejiang (CN)

(72) Inventors: Mengtao Zhou, Beijing (CN); Zhenglin Qi, Beijing (CN); Yihong Xiu, Beijing (CN); Daogui Liu, Beijing (CN); Yuchao Zhu, Beijing (CN); Gao Song, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 16/465,005

(22) PCT Filed: Nov. 29, 2017

(86) PCT No.: PCT/CN2017/113553
§ 371 (c)(1),
(2) Date: May 29, 2019

(87) PCT Pub. No.: WO2018/099393
PCT Pub. Date: Jun. 7, 2018

(65) Prior Publication Data
US 2019/0296924 A1 Sep. 26, 2019

(30) Foreign Application Priority Data
Nov. 30, 2016 (CN) .......................... 2016 1 1086329

(51) Int. Cl.
*H04L 12/18* (2006.01)
*H04L 12/46* (2006.01)
*H04L 12/931* (2013.01)

(52) U.S. Cl.
CPC .......... *H04L 12/18* (2013.01); *H04L 12/4641* (2013.01); *H04L 12/4645* (2013.01); *H04L 49/201* (2013.01)

(58) Field of Classification Search
CPC . H04L 12/18; H04L 12/4645; H04L 12/4641; H04L 49/201
See application file for complete search history.

(56) References Cited

U.S. PATENT DOCUMENTS

| 2010/0293043 A1* | 11/2010 | Atreya | G06F 11/2023 |
| | | | 705/14.4 |
| 2011/0013551 A1* | 1/2011 | Shiroko | H04L 12/185 |
| | | | 370/312 |
| 2011/0249551 A1* | 10/2011 | Rollins | H04L 12/437 |
| | | | 370/222 |

(Continued)

FOREIGN PATENT DOCUMENTS

| CN | 102684979 | 9/2012 |
| CN | 102594649 B | 9/2016 |

(Continued)

OTHER PUBLICATIONS

ISA State Intellectual Property Office of the People's Republic of China, International Search Report Issued in Application No. PCT/CN2017/113553, dated Feb. 9, 2018, WIPO, 4 pages.

(Continued)

*Primary Examiner* — Ajay Cattungal
(74) *Attorney, Agent, or Firm* — Greenblum & Bernstein, P.L.C.

(57) ABSTRACT

A method, device and system for forwarding a multicast data packet are provided. The system is an extended bridge constructed by a controlling bridge and a port extender. The controlling bridge transmits a multicast data packet with an ETAG having a multicast ECID via a cascade port, and the multicast ECID directs to egress ports in different VLANs of the multicast group on a port extender connected with the cascade port. The port extender receives the packet with the ETAG via an upstream port connected with the controlling bridge, searches for multicast duplication information matching the multicast ECID, duplicates the packet for each egress port based on the multicast duplication information, removes the ETAG of each copy of the packet, adds a port identification and a VLAN identification of each egress port to each copy of the packet, and transmits the packet containing the VLAN identification via each egress port.

13 Claims, 5 Drawing Sheets

(56) References Cited

U.S. PATENT DOCUMENTS

| | | | |
|---|---|---|---|
| 2011/0299529 A1* | 12/2011 | Olsson | H04L 45/74 370/390 |
| 2012/0201244 A1* | 8/2012 | Ou | H04L 12/185 370/390 |
| 2013/0094506 A1 | 4/2013 | Song | |
| 2014/0003428 A1* | 1/2014 | Li | H04L 12/56 370/390 |
| 2014/0044129 A1 | 2/2014 | Mentze et al. | |
| 2014/0223435 A1* | 8/2014 | Chang | H04L 67/38 718/1 |
| 2014/0269710 A1 | 9/2014 | Sundaram et al. | |
| 2015/0256405 A1* | 9/2015 | Janardhanan | H04L 49/354 370/255 |
| 2015/0312151 A1* | 10/2015 | Krishnamurthy | H04L 45/04 370/389 |
| 2016/0205019 A1 | 7/2016 | Sundaram et al. | |

FOREIGN PATENT DOCUMENTS

| | | |
|---|---|---|
| CN | 105991445 A | 10/2016 |
| JP | 2014510483 A | 4/2014 |

OTHER PUBLICATIONS

State Intellectual Property Office of the People's Republic of China, Office Action and Search Report Issued in Application No. 201611086329.X, dated Jan. 7, 2020, 15 pages. (Submitted with Machine Translation).

European Patent Office, Extended European Search Report Issued in Application No. 17876182.1, dated Aug. 9, 2019, Germany, 9 pages.

ISA State Intellectual Property Office of the People's Republic of China, Written Opinion of the International Searching Authority Issued in Application No. PCT/CN2017/113553, dated Feb. 9, 2018, WIPO, 5 pages.

State Intellectual Property Office of the People's Republic of China, Office Action and Search Report Issued in Application No. 201611086329X, dated Jul. 9, 2020, 13 pages, (Submitted with Machine Translation).

Japanese Patent Office, Office Action Issued in Application No. 2019-528865, dated Jun. 16, 2020, 8 pages. (Submitted with Machine Translation).

* cited by examiner

FORWARDING MULTICAST DATA PACKET

CROSS REFERENCE TO RELATED APPLICATION

The present application is a National Phase of International Application Number PCT/CN2017/113553, filed Nov. 29, 2017, and claims priority to Chinese Patent Application No. 201611086329.X entitled "METHOD, DEVICE AND SYSTEM FOR FORWARDING MULTICAST DATA PACKET" filed on Nov. 30, 2016, the entire content of which is incorporated herein by reference.

BACKGROUND

An Extended Bridge is constructed utilizing a Controlling Bridge (CB) and one or more Port Extenders (PE). The CB may be a single bridge or a bridge constructed by a plurality of stacked bridges.

In one of prior multicast data packet forwarding methods utilized in the extended bridge, the CB may assign multiple multicast E-Channel Identifiers (ECIDs) to egress ports on a PE which belong to one multicast group but different Virtual Local Area Networks (VLANs), duplicate multiple copies of a multicast data packet for the egress ports in each VLAN, and add a VLAN tag and an ETAG to each copy of the multicast data packet. In each copy of the multicast data packet, the multicast ECID carried in the ETAG indicates the egress ports belonging to one VLAN corresponding to the VLAN tag. The CB may transmit the multiple copies of the multicast data packet carrying different the VLAN tags and the different ETAGs to the PE via a cascade port. Based on each copy of the multicast data packets carrying a VLAN tag and a ETAG; the PE may duplicate one copy of the multicast data packet for each egress port corresponding to a multicast ECID of the ETAG, and transmit each copy of the multicast data packet with the ETAG removed therefrom via each egress port.

Based on the above method of forwarding a multicast data packet, the occupied bandwidth of an E-stack link may be increased by transmitting a plurality of copies of the multicast data packet to the PE via the cascade port.

DETAILED DESCRIPTION OF THE EMBODIMENTS

The technical solutions of examples of the present disclosure will be described clearly and fully below in combination with the accompanying drawings in the examples of the present disclosure. It is apparent that the described examples are merely part of examples of the present disclosure rather than all examples. All other examples achieved by those of ordinary skill in the art based on the examples in the present disclosure without paying creative work shall fall into the scope of protection of the present disclosure.

Figure 1:
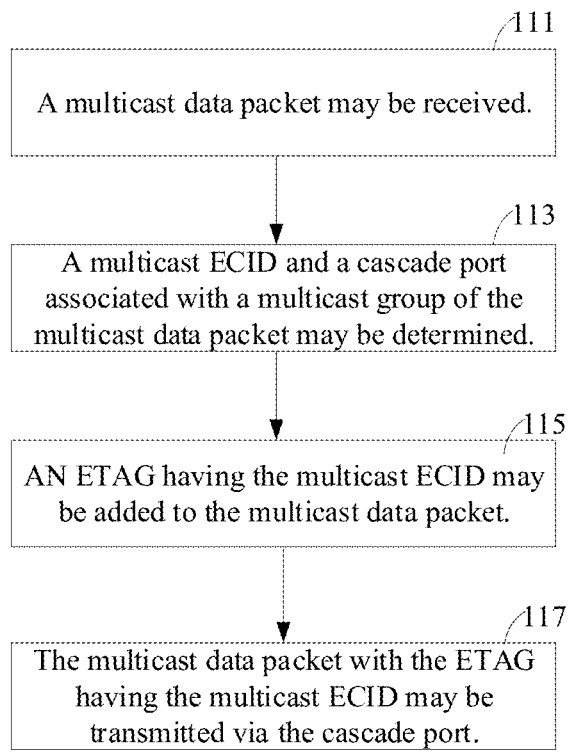
FIG. 1 illustrates a flow diagram of a method of forwarding a multicast data packet based on an example of the present disclosure.

FIG. 1 illustrates a flow diagram of a method of forwarding a multicast data packet based on an example of the present disclosure. The method may be applied to a controlling bridge of an extended bridge. As shown in FIG. 1, the method may include the following blocks.

At block 111, a multicast data packet may be received.

At block 113, a multicast ECID and a cascade port associated with a multicast group of the multicast data packet may be determined, where the multicast ECID directs to egress ports in different VLANs of the multicast group on a port extender connected with the cascade port.

At block 115, an ETAG having the multicast ECID may be added to the multicast data packet.

At block 117, the multicast data packet with the ETAG having the multicast ECID may be transmitted via the cascade port.

The method of forwarding a multicast data packet shown in FIG. 1 has the advantages that a controlling bridge may transmit one copy of multicast data packet to a PE on which egress ports belong to one multicast group but different VLANs, thereby reducing the occupied bandwidth of an E-stack link.

Figure 2:
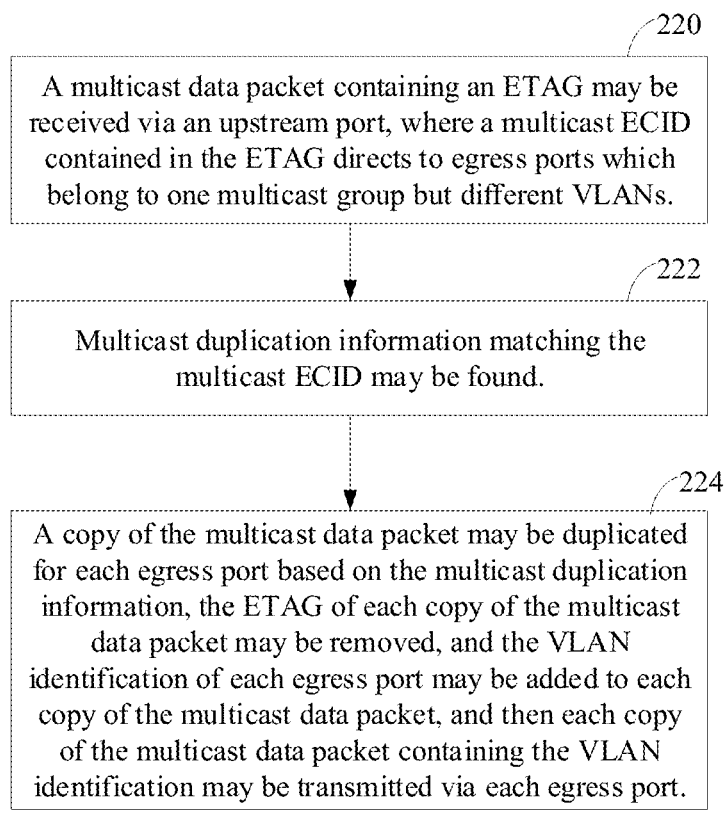
FIG. 2 illustrates another flow diagram of a method of forwarding a multicast data packet based on an example of the present disclosure.

FIG. 2 illustrates a flow diagram of a method of forwarding a multicast data packet based on an example of the present disclosure. The method may be applied to a port extender of an extended bridge system. As shown in FIG. 2, the method may include the following blocks.

At block 220, a multicast data packet containing an ETAG may be received via an upstream port, where a multicast ECID contained in the ETAG directs to egress ports which belong to one multicast group but different VLANs.

At block 222, multicast duplication information matching the multicast ECID may be found, where the multicast duplication information contains each egress port of the multicast group corresponding to the multicast data packet and a VLAN identification of each egress port.

At block 224, a copy of the multicast data packet may be duplicated for each egress port based on the multicast duplication information, the ETAG of each copy of the multicast data packet may be removed, and the VLAN identification of each egress port may be added to each copy of the multicast data packet, and then each copy of the multicast data packet containing the VLAN identification may be transmitted via each egress port.

The method of forwarding a multicast data packet shown in FIG. 2 has the advantages that a port extender may duplicate a multicast data packet for egress ports of different VLANs based on the multicast data packet forwarded by a controlling bridge and transmit each copy of the multicast data packet via each egress port.

Figure 3:
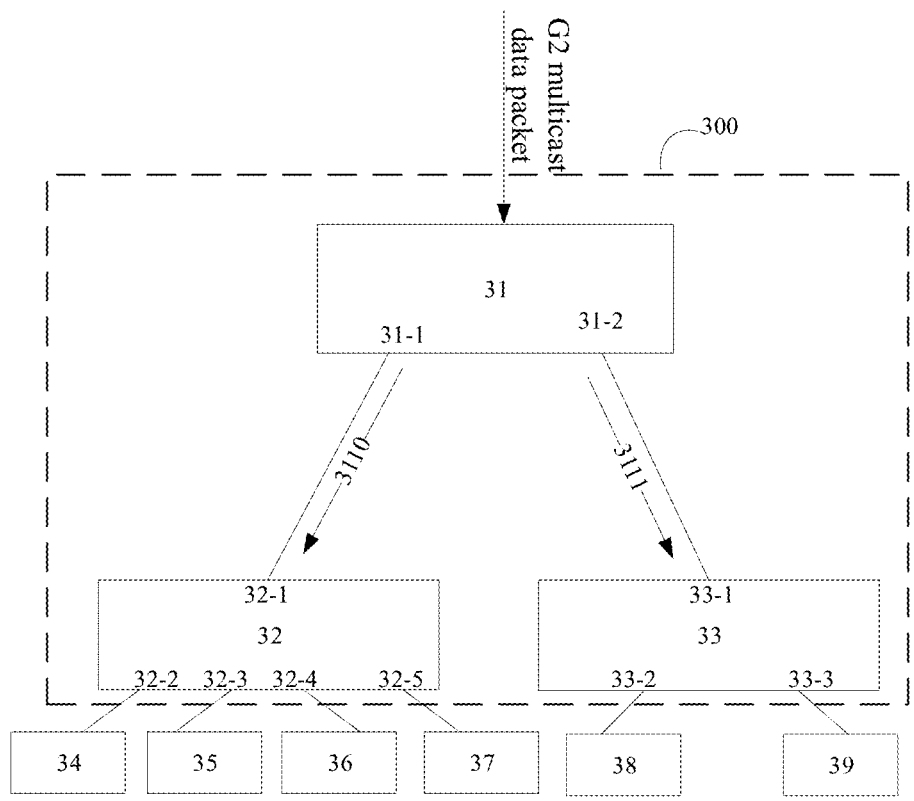
FIG. 3 illustrates a schematic diagram of forwarding a multicast data packet by an extended bridge based on an example of the present disclosure.

In an extended bridge 300 shown in FIG. 3, a CB 31 may be connected to an upstream port 32-1 of a PE 32 and an upstream port 33-1 of a PE 33 via cascade ports 31-1 and 31-2, respectively. Extended ports 32-2, 32-3, 32-4 and 32-5 of the PE 32 are connected to terminals 34-37, respectively, and extended ports 33-2 and 33-3 of the PE 33 are connected to terminals 38 and 39, respectively. The terminals 34, 35 and 38 belong to a VLAN 10, and terminals 36, 37 and 39 belong to a VLAN 20.

The terminal 34 may transmit an Internet Group Management Protocol (IGMP) membership report packet for joining a multicast group G2. The PE 32 may receive the IGMP membership report packet via the extended port 32-2, and add an ETAG and a VLAN 10 tag to the packet, wherein the ETAG carries a unicast ECID of the extended port 32-2. The PE 32 may transmit the IGMP membership report packet with the ETAG and the VLAN 10 tag via the upstream port 32-1. The CB 31 may receive the IGMP membership report packet containing the ETAG having the unicast ECID of the extended port 32-2 and the VLAN 10 tag via the cascade port 31-1, and search for a multicast ECID and a cascade port corresponding to the multicast group G2. If no multicast ECID associated with an egress port of the multicast group G2 on the PE 32 is found, a multicast ECID 3000 may be assigned for the egress port of the multicast group G2 on the PE 32. Then, the CB 31 may record the multicast ECID 3000 and the cascade port 31-1 associated with the multicast group G2.

The CB 31 may identify the egress port as the extended port 32-2 based on the unicast ECID of the extended port 32-2, and identify the VLAN 10 to which the egress port belongs based on the VLAN 10 identification. The CB 31 may generate multicast duplication information (port 32-2, VLAN 10), indicating that the egress port 32-2 belongs to VLAN 10.

The CB 31 may transmit the assigned multicast ECID 3000 and the generated multicast duplication information to the PE 32 via the cascade port 31-1.

The PE 32 may record that the multicast ECID 3000 is associated with the received multicast duplication information. For example, the PE 32 may record that the multicast ECID 3000 is associated with the multicast duplication information (port 32-2, VLAN 10). For another example, the PE 32 may record a multicast duplication table index associated with the multicast ECID 3000 and record (port 32-2, VLAN 10) in the multicast duplication information that the multicast duplication table index directs to. The manner of recording the multicast duplication information by the PE is not limited herein.

The terminals 35-37 may send IGMP membership report packets for joining the multicast group G2, respectively. The PE 32 may add the ETAGs and the VLAN tags to the packets in the same manner. The PE 32 may then transmit the IGMP membership report packets with the ETAGs and the VLAN tags via the upstream port 32-1.

The CB 31 may receive these IGMP membership report packets via the cascade port 31-1 and find the multicast ECID 3000 associated with the egress port of the multicast group G2 on the PE 32. The CB 31 may generate a multicast duplication relationship (port 32-3, VLAN 10) and a multicast duplication relationship (port 32-4, port 32-5, VLAN 20). The CB 31 may transmit the multicast ECID 3000 and the generated multicast duplication relationships to the PE 32.

For example, the PE 32 may further record that the multicast ECID 3000 is associated with the multicast duplication relationship (port 32-2, port 32-3, VLAN 10) and the multicast duplication relationship (port 32-4, port 32-5, VLAN 20) so as to record each egress port associated with the multicast ECID 3000 and the VLAN of each egress port. For another example, the PE 32 may record the multicast duplication relationship (port 32-2, port 32-3, VLAN 10) and the multicast duplication relationship (port 32-4, port 32-5, VLAN 20) in an egress port duplication table that the multicast duplication table index associated with the multicast ECID 3000 directs to.

The terminals 38 and 39 may transmit IGMP membership report packets for joining the multicast group G2, respectively. The PE 33 may receive the IGMP membership report packets and add ETAGs having unicast ECIDs and VLAN tags into the packets, and then transmit them via the upstream port 33-1.

The CB 31 may receive the IGMP membership report packets containing the ETAGs having unicast ECIDs and the VLAN tags via the cascade port 31-2 and assign a multicast ECID 3001 for egress ports on the PE 33 which belong to the multicast group G2 but different VLANs. The CB 31 may generate multicast duplication information (port 33-2, VLAN 10) and multicast duplication information (port 33-3, VLAN 20). The CB 31 may record the multicast ECID 3001 and the cascade port 31-2 associated with the multicast group G2. The CB 31 may transmit the multicast ECID 3001 and the generated multicast duplication information (port 33-2, VLAN 10) and (port 33-3, VLAN 20) to the PE 33 via the cascade port 31-2. The CB 31 may assign one multicast ECID for the extended ports on PE 32 which are in different VLANs but the same multicast group G2, and assign one multicast ECID for the Extended ports on the PE 33 which are in different VLANs but the same multicast group G2, thereby saving the resource of the multicast ECID.

The PE 33 may record that the multicast ECID 3001 is associated with the multicast duplication relationship (port 33-2, VLAN 10) and the multicast duplication relationship (port 33-3, VLAN 20) so as to record each egress port associated with the multicast ECID 3001 and a VLAN to which each egress port belongs. In an example, the PE 32 may record the multicast duplication relationship (port 33-2, VLAN 10) and (port 33-3, VLAN 20) in an egress port duplication table that a multicast duplication table index associated with the multicast ECID 3001 directs to.

As shown in FIG. 3, when receiving a multicast data packet, the CB 31 may find the multicast ECID 3000 and ECID 3001 associated with the multicast group G2 based on a multicast group G2 address or a multicast source address of the multicast data packet. The CB 31 may duplicate one copy of the multicast data packet for all egress ports of the multicast group G2 on the PE 32 based on the ECID 3000, add the ETAG having the ECID 3000 to the packet and transmit one copy of the multicast data packet 3110 with the ECID 3000 via the cascade port 31-1. The CB 31 may duplicate one copy of the multicast data packet for all egress ports of the multicast group G2 on the PE 33 based on the ECID 3001, add the ETAG having the ECID 3001 to the packet and transmit one copy of the multicast data packet 3111 with the ECID 3001 via the cascade port 31-2. The CB 31 may duplicate two copies of the multicast data packet, i.e., one copy of the multicast data packet for the egress ports in different VLANs of the multicast group G2 on the PE 32 and one copy of the multicast data packet for the egress ports in different VLANs of the multicast group G2 on the PE 33. Therefore, the CB 31 does not have to transmit multiple copies of multicast data packets of different VLANs for the multicast group G2 to each PE over multiple E-stack links, thereby reducing the occupied bandwidth of the E-stack link.

The PE 32 may receive the multicast data packet 3110 carrying the ETAG via the upstream port 32-1, and duplicate a multicast data packet for each egress port based on multicast duplication information (port 32-2, port 32-2, VLAN 20) and (port 32-4, port 32-5, VLAN 20) matching the multicast ECID 3000 in the ETAG, and removes the ETAG of each copy of the multicast data packet. The PE 32 may add the VLAN 10 identification to two copies of the multicast data packet based on the VLAN 10 of the egress ports 32-2 and 32-3 and transmit the two multicast data packets with the VLAN 10 identification to the terminals 34 and 35 via the extended ports 32-2 and 32-3. The PE 32 may add the VLAN 20 identification to another two copies of the multicast data packet based on the VLAN 20 of the egress ports 32-4 and 32-5, respectively, and transmit the two multicast data packets with the VLAN 20 identification to the terminals 36 and 37 via the extended ports 32-4 and 32-5, respectively.

The PE 33 may receive a multicast data packet 3111 carrying an ETAG via the upstream port 33-1, and duplicate the multicast data packet for each egress port based on multicast duplication information (port 33-3, VLAN 10) and (port 33-4, VLAN 20) matching with the multicast ECID 3001, and remove the ETAG of each copy of the multicast data packet. The PE 33 may add the VLAN 10 identification to one copy of the multicast data packet based on the VLAN 10 of the egress port 33-2 and transmit the multicast data packet with the VLAN 10 identification to the terminal 38 via the extended port 33-2. The PE 33 may add the VLAN 10 identification to another copy of the multicast data packet based on the VLAN 20 of the egress port 33-3 and transmit the multicast data packet with the VLAN 20 identification to the terminal 39 via the extended port 33-3.

The PE 32 and the PE 33 may respectively execute layer-3 duplicating and forwarding based on the multicast duplication information associated with the multicast ECID of the multicast group G2 to transmit a multicast data packet from a CB to member ports of different VLANs for the multicast group G2.

In an extended bridge shown in FIG. 3, for example, the CB 31 may be a single device, and may also be a stacked device constructed by stacking a plurality of devices. When the CB 31 is a stacked device, the cascade ports 31-1 and 31-2 of the CB 31 are aggregate ports including a plurality of member ports. The CB 31 may receive IGMP membership report packets containing unicast ECIDs and VLAN identifications transmitted by the PE 32 and the PE 33 via upstream ports from any member port of the cascade ports 31-1 and 31-2. The CB 31 may also select any member port of the cascade ports 31-1 and 31-2 to transmit the multicast ECID, the multicast duplication information and the multicast data packet with the multicast ECID. Each of the PE 32 and the PE 33 may select one of a plurality of upstream ports connected to the CB 31 to transmit the IGMP membership report packet containing the unicast ECID and the VLAN identification. Similarly, in the extended bridge shown in FIG. 3, for example, other extended ports of the PE 32 and the PE 33 that are not connected to terminals may also be connected to other PE devices.

Figure 4:
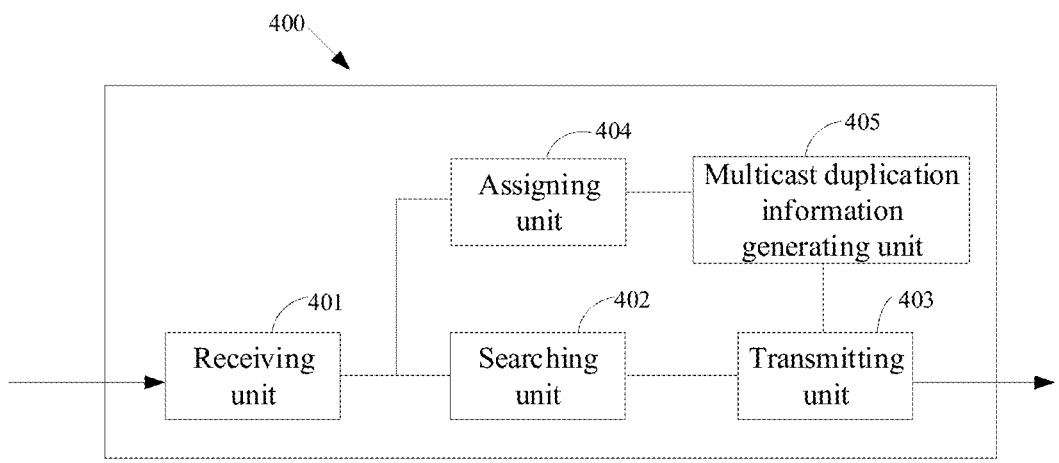
FIG. 4 illustrates a schematic structure diagram of a device for forwarding a multicast data packet based on an example of the present disclosure.

FIG. 4 illustrates a schematic structure diagram of a device 400 for forwarding a multicast data packet based on an example of the present disclosure. The device 400 may be applied to a controlling bridge of an extended bridge. The device 400 for forwarding a multicast data packet may include a receiving unit 401, a searching unit 402, a transmitting unit 403, an assigning unit 404, and a multicast duplication information generating unit 405.

The receiving unit 401 is configured to receive a multicast data packet. The searching unit 402 is configured to determine a multicast E-Channel Identifier (ECID) and a cascade port associated with a multicast group of the multicast data packet, where the multicast ECID directs to egress ports in different VLANs of the multicast group on a port extender connected with the cascade port. The transmitting unit 403 is configured to add an ETAG having the multicast ECID to the multicast data packet and transmit the multicast data packet with the ETAG having the multicast ECID via the cascade port.

The assigning unit 404 is configured to assign the multicast ECID for egress ports of different VLANs for the multicast group on the port extender. The multicast duplication information generating unit 405 is configured to record that the multicast group is associated with the multicast ECID and the cascade port and obtain the egress ports in different VLANs of the multicast group on the port extender connected to the cascade port, and generate multicast duplication information, wherein the multicast duplication information contains a port identification and a VLAN identification of each egress port of the multicast group. The transmitting unit 403 is further configured to transmit the multicast ECID and the multicast duplication information via the cascade port.

The receiving unit 401 is further configured to receive a plurality of Internet Group Management Protocol (IGMP) membership report packets for joining the multicast group via the cascade port, where each IGMP membership report packet carries an ETAG and an associated VLAN identification. The multicast duplication information generating unit 405 is further configured to identify each egress port based on an extended port indicated by a unicast ECID of the ETAG in each IGMP membership report packet, and identify a VLAN to which each egress port belongs based on the VLAN identification in each IGMP membership report packet.

The device 400 for forwarding a multicast data packet shown in FIG. 4 may be implemented by software (for example, by machine-executable instructions stored in a memory and run by a processor), by hardware (for example, by a processor of an Application Specific Integrated Circuit (ASIC)), or by a combination of software and hardware.

Figure 5:
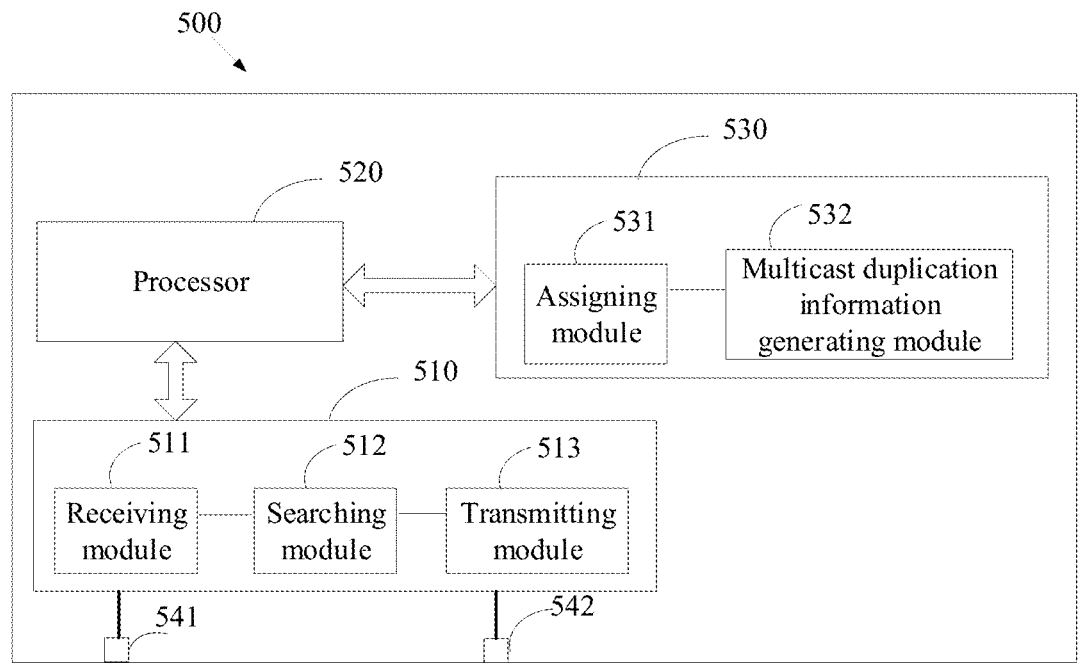
FIG. 5 illustrates a schematic structure diagram of a controlling bridge provided with the device for forwarding a multicast data packet in FIG. 4 based on an example of the present disclosure.

FIG. 5 illustrates a controlling bridge provided with the device for forwarding a multicast data packet in FIG. 4 based on an example of the present disclosure. In FIG. 5, the controlling bridge 500 includes a forwarding unit 510, a processor 520, and a storing unit 530, a cascade port 541 and a physical port 542 that are connected to the processor 520. The forwarding unit 510 here may be, for example, a hardware forwarding chip. The storing unit 530 may be any electronic, magnetic, optical or other physical storage device, for example, a Random Access Memory (RAM), a volatile memory, a nonvolatile memory, a flash memory, a storage drive (e.g., hard disk drive), a solid state disk, or any type of storage disk.

The forwarding unit 510 includes at least a receiving module 511, a searching module 512 and a transmitting module 513. The storing unit 530 includes one or more encoding modules that can be run by the processor 520. A plurality of encoding modules of the storing unit 530 include at least an assigning module 531 and a multicast duplication information generating module 532.

The receiving module 511 is configured to receive a multicast data packet via the physical port 542. The searching module 512 is configured to determine a multicast ECID and the cascade port 541 associated with multicast group of the multicast data packet, where the multicast ECID directs to egress ports in different VLANs of the multicast group on a port extender connected with the cascade port 541. The transmitting module 513 is configured to add an ETAG having the multicast ECID to the multicast data packet and transmit the multicast data packet with the ETAG having the multicast ECID via the cascade port 541.

The assigning module 531 is configured to assign the multicast ECID for egress ports in different VLANs of the multicast group on the port extender. The multicast duplication information generating module 532 is configured to obtain the egress ports in different VLANs of the multicast group on the port extender connected to the cascade port 541, and generate multicast duplication information, where the multicast duplication information contains a port identification and a VLAN identification of each egress port of the multicast group. The transmitting module 513 is further configured to transmit the multicast ECID and the multicast duplication information via the cascade port 541.

The receiving module 511 is further configured to receive a plurality of Internet Group Management Protocol (IGMP) membership report packets for joining the multicast group via the cascade port 541, where each IGMP membership report packet carries an ETAG and an associated VLAN identification. The multicast duplication information generating module 532 is further configured to identify each egress port based on an extended port indicated by a unicast ECID of the ETAG in each IGMP membership report packet, and identify a VLAN to which each egress port belongs based on the VLAN identification in each IGMP membership report packet.

Figure 6:
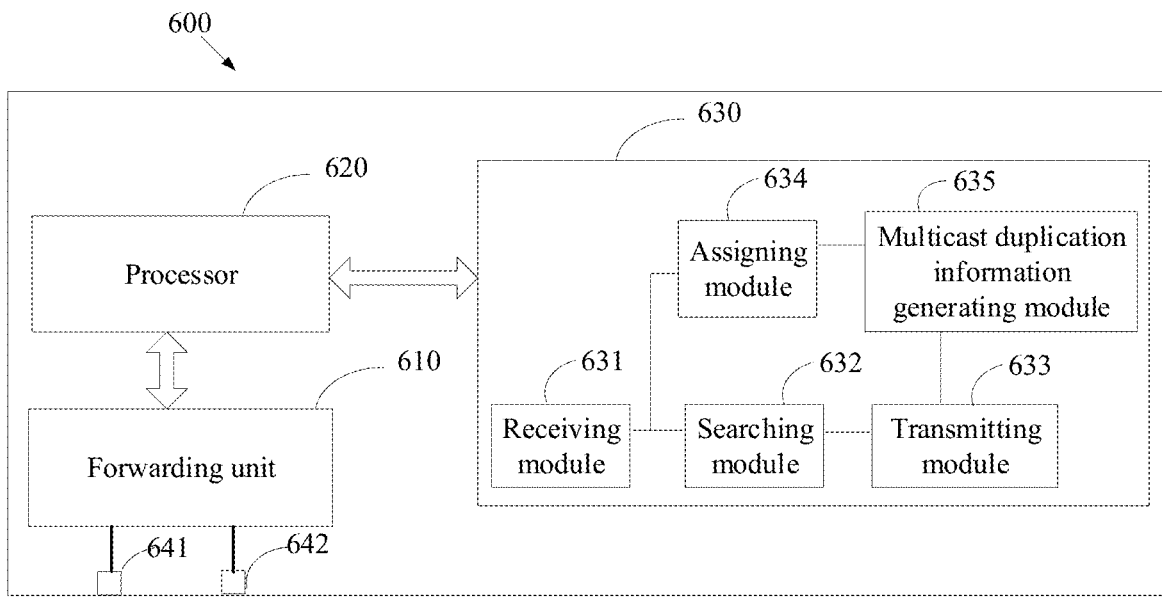
FIG. 6 illustrates a schematic structure diagram of a controlling bridge provided with the device for forwarding a multicast data packet in FIG. 4 based on an example of the present disclosure.

FIG. 6 illustrates a controlling bridge provided with the device for forwarding a multicast data packet in FIG. 4 based on another example of in the present disclosure. In FIG. 6, the controlling bridge 600 includes a forwarding unit 610, a processor 620, and a storing unit 630, a cascade port 641 and a physical port 642 that are connected to the processor 620. A plurality of encoding modules of the storing unit 630 include at least a receiving module 631, a searching module 632, a transmitting module 633, an assigning module 634, and a multicast duplication information generating module 635. The forwarding unit 610 here may be, for example, a hardware forwarding chip. The storing unit 630 may be any electronic, magnetic, optical or other physical storage device, for example, a Random Access Memory (RAM), a volatile memory, a nonvolatile memory, a flash memory, a storage drive (e.g., hard disk drive), a solid state disk, or any type of storage disk.

The forwarding unit 610 is configured to receive a multicast data packet via the physical port 642 and transmit the packet to the processor 620, and the processor 620 executes corresponding encoding modules in the storing unit 630 to process the multicast data packet, which specifically includes the following operations:

The receiving module 631 is configured to receive the multicast data packet. The searching module 632 is configured to determine the multicast ECID and the cascade port 641 associated with the multicast group of the multicast data packet, where the multicast ECID directs to egress ports in different VLANs of the multicast group on a port extender connected with the cascade port 641. The transmitting module 633 is configured to add an ETAG having the multicast ECID to the multicast data packet and control the forwarding unit 610 to transmit the multicast data packet with the ETAG having the multicast ECID via the cascade port 641.

The assigning module 634 is configured to assign the multicast ECID for egress ports in different VLANs of the multicast group on the port extender. The multicast duplication information generating module 635 is configured to obtain the egress ports in different VLANs of the multicast group on the port extender connected to the cascade port 641, and generate multicast duplication information, where the multicast duplication information contains a port identification and a VLAN identification of each egress port of the multicast group. The transmitting module 633 is further configured to transmit the multicast ECID and the multicast duplication information via the cascade port 641.

The receiving module 631 is further configured to receive a plurality of IGMP membership report packets for joining the multicast group, where each IGMP membership report packet carries an ETAG and an associated VLAN identification. The multicast duplication information generating module 635 is configured to identify each egress port based on an extended port indicated by a unicast ECID of the ETAG in each IGMP membership report packet, and identify a VLAN to which each egress port belongs based on the VLAN identification in each IGMP membership report packet.

Figure 7:
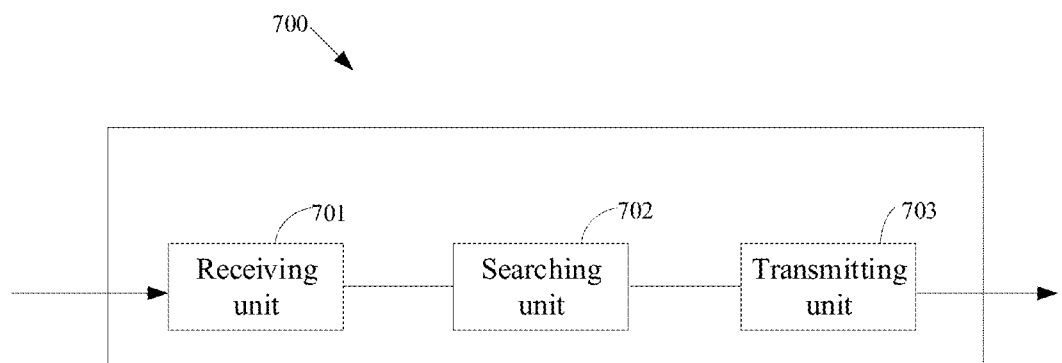
FIG. 7 illustrates a schematic structure diagram of a device for forwarding a multicast data packet based on an example of the present disclosure.

FIG. 7 illustrates a device 700 for forwarding a multicast data packet based on an example of the present disclosure. The device may be applied to a port extender of an extended bridge. The device 700 for forwarding a multicast data packet may include a receiving unit 701, a searching unit 702 and a transmitting unit 703. The receiving unit 701 is configured to receive a multicast data packet containing an ETAG having a multicast ECID via an upstream port. The searching unit 702 is configured to search for multicast duplication information matching the multicast ECID, where the multicast duplication information contains a port identification and a VLAN identification of each egress port of the multicast group corresponding to the multicast data packet. The transmitting unit 703 is configured to duplicate the multicast data packet for each egress port based on the multicast duplication information, remove the ETAG of each copy of the multicast data packet, add the VLAN identification of each egress port to each copy of the multicast data packet, and transmit the multicast data packet containing the VLAN identification via each egress port.

The receiving unit 701 is further configured to receive IGMP membership report packets for joining the multicast group via extended ports. The transmitting unit 703 is further configured to add each IGMP membership report packet with an ETAG and a VLAN identification based on a unicast ECID and a VLAN of each extended port receiving each IGMP membership report packet, and transmit each IGMP membership report packet with the ETAG and the VLAN identification via the upstream port.

The receiving unit 701 is further configured to receive the multicast ECID and the multicast duplication information associated with the multicast ECID which are assigned by a CB via the upstream port. The searching unit 702 is further configured to record the received multicast ECID and the multicast duplication information.

The device 700 for forwarding a multicast data packet shown in FIG. 7 may be implemented by software (for example, by machine-executable instructions stored on a memory and run by a processor), by hardware (for example, by a processor of an Application Specific Integrated Circuit (ASIC)), or by a combination of software and hardware.

Figure 8:
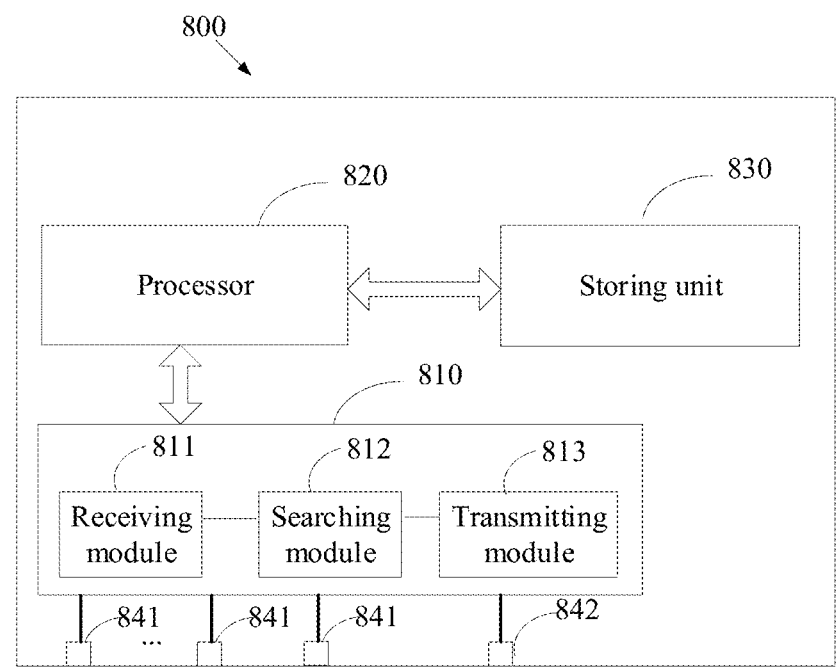
FIG. 8 illustrates a schematic structure diagram of a port extender provided with the device for forwarding a multicast data packet in FIG. 7 based on an example of the present disclosure.

FIG. 8 illustrates a port extender provided with the device for forwarding a multicast data packet in FIG. 7 based on an example of the present disclosure. In FIG. 8, the controlling bridge 800 includes a forwarding unit 810, a processor 820, and a storing unit 830, a plurality of extended ports 841 and an upstream port 842 that are connected to the processor 820. The forwarding unit 810 includes at least a receiving module 811, a searching module 812, and a transmitting module 813. The forwarding unit 810 here may be, for example, a hardware forwarding chip. The storing unit 830 may be any electronic, magnetic, optical or other physical storage device, for example, a Random Access Memory (RAM), a volatile memory, a nonvolatile memory, a flash memory, a storage drive (e.g., hard disk drive), a solid state disk, or any type of storage disk.

The receiving module 811 is configured to receive a multicast data packet containing an ETAG having a multicast ECID via the upstream port 842. The searching module 812 is configured to search for multicast duplication information matching the multicast ECID, where the multicast duplication information contains a port identification and a VLAN identification of each egress port of the multicast group corresponding to the multicast data packet. The transmitting module 813 is configured to duplicate the multicast data packet for each egress port based on the multicast duplication information, remove the ETAG of each copy of the multicast data packet, add the VLAN identification of each egress port to each copy of the multicast data packet, and transmit the multicast data packet containing the VLAN identification via each egress port.

The receiving module 811 is further configured to receive IGMP membership report packets for joining the multicast group via the extended ports 841. The transmitting module 813 is configured to add each IGMP membership report packet with an ETAG and a VLAN identification based on a unicast ECID and a VLAN of each extended port receiving each IGMP membership report packet, and transmit each IGMP membership report packet with the ETAG and the VLAN identification via the upstream port 842.

The receiving module 811 is further configured to receive the multicast ECID and the multicast duplication information associated with the multicast ECID which are assigned by a CB. The searching module 812 is further configured to record the received multicast ECID and the multicast duplication information.

Figure 9:
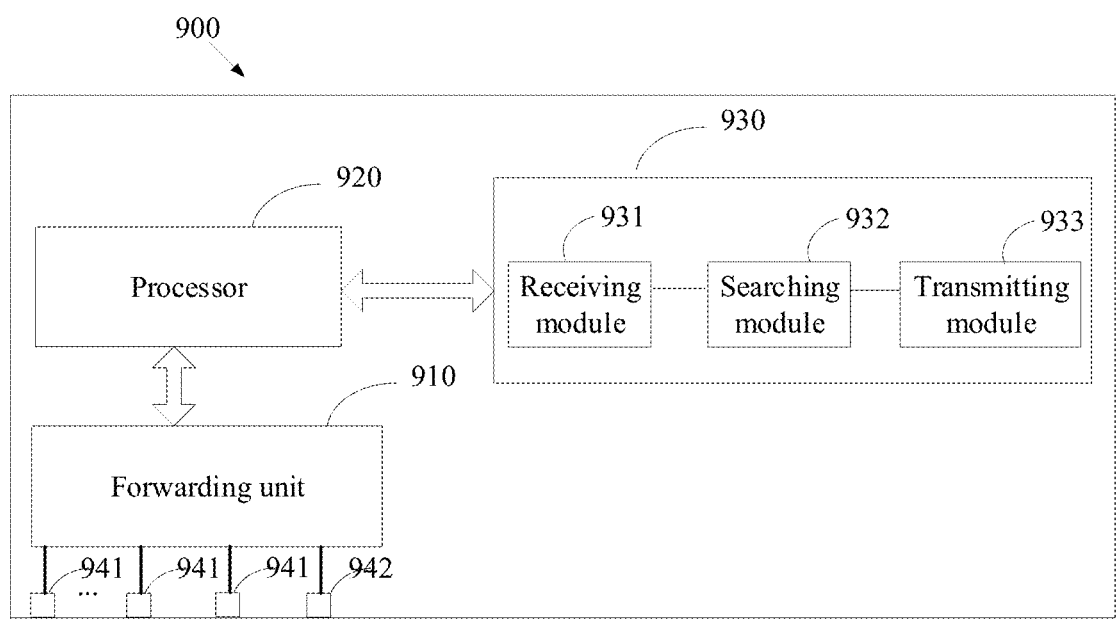
FIG. 9 illustrates a schematic structure diagram of a port extender provided with the device for forwarding a multicast data packet in FIG. 7 based on an example of the present disclosure.

FIG. 9 illustrates a port extender provided with the device for forwarding a multicast data packet in FIG. 7 based on another example of the present disclosure. In FIG. 9, the controlling bridge 900 includes a forwarding unit 910, a processor 920, and a storing unit 930, a plurality of extended ports 941 and an upstream port 942 that are connected to the processor 920. A plurality of encoding modules of the storing unit 930 include at least a receiving module 931, a searching module 932, and a transmitting module 933. The forwarding unit 910 here may be, for example, a hardware forwarding chip. The storing unit 930 may be any electronic, magnetic, optical or other physical storage device, for example, a Random Access Memory (RAM), a volatile memory, a nonvolatile memory, a flash memory, a storage drive (e.g., hard disk drive), a solid state disk, or any type of storage disk.

The forwarding unit 910 is configured to receive a multicast data packet containing an ETAG having an ECID via the upstream port 942 and transmit the packet to the processor 920, and the processor 920 executes corresponding encoding modules in the storing unit 930 to process the multicast data packet, which specifically includes the following operations:

The receiving module 931 is configured to receive the multicast data packet. The searching module 932 is configured to search for multicast duplication information matching the multicast ECID, where the multicast duplication information contains a port identification and a VLAN identification of each egress port of the multicast group corresponding to the multicast data packet. The transmitting module 933 is configured to duplicate the multicast data packet for each egress port based on the multicast duplication information, remove the ETAG of each copy of the multicast data packet, add the VLAN identification of each egress port to each copy of the multicast data packet, and transmit the multicast data packet containing the VLAN identification via each egress port.

The receiving module 931 is further configured to receive IGMP membership report packets for joining the multicast group. The transmitting module 933 is further configured to add each IGMP membership report packet with an ETAG and a VLAN identification based on a unicast ECID and a VLAN of each extended port receiving each IGMP membership report packet and control the forwarding unit 910 to transmit each IGMP membership report packet with the ETAG and the VLAN identification via the upstream port 942.

The receiving module 931 is further configured to receive the multicast ECID and the multicast duplication information associated with the multicast ECID which are assigned by a controlling bridge. The searching module 932 is configured to record the received multicast ECID and the multicast duplication information.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected based on actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided based on the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of forwarding a multicast data packet, comprising:
   receiving, by a controlling bridge, a multicast data packet;
   determining, by the controlling bridge, a multicast E-Channel Identification (ECID) and a cascade port associated with a multicast group of the multicast data packet, wherein the multicast ECID directs to egress ports in different VLANs of the multicast group on a port extender connected with the cascade port;
   adding, by the controlling bridge, an Extension VLAN Tag (ETAG) having the multicast ECID to the multicast data packet; and
   transmitting, by the controlling bridge, the multicast data packet with the ETAG having the multicast ECID via the cascade port.

2. The method according to claim 1, wherein before receiving the multicast data packet, the method comprises:
   obtaining, by the controlling bridge, egress ports in different VLANs of the multicast group on the port extender connected with the cascade port;
   assigning, by the controlling bridge, the multicast ECID for the egress ports in different VLANs of the multicast group on the port extender;
   recording, by the controlling bridge, that the multicast group is associated with the multicast ECID and the cascade port;
   generating, by the controlling bridge, multicast duplication information, wherein the multicast duplication information contains a port identification and a VLAN identification of each egress port of the multicast group on the port extender; and
   transmitting, by the controlling bridge, the multicast ECID and the multicast duplication information to the port extender via the cascade port.

3. The method according to claim 2, wherein obtaining the egress ports in different VLANs of the multicast group on the port extender connected with the cascade port comprises:
   receiving, by the controlling bridge, a plurality of Internet Group Management Protocol (IGMP) membership report packets containing VLAN identifications and ETAGs and for joining the multicast group, via the cascade port;
   identifying, by the controlling bridge, each egress port based on an extended port indicated by a unicast ECID of the ETAG in each IGMP membership report packet; and
   identifying, by the controlling bridge, a VLAN to which each egress port belongs based on the VLAN identification in each IGMP membership report packet.

4. A device for forwarding a multicast data packet, which is applied to a controlling bridge of an extended bridge, and the device comprising:
   a receiving unit configured to receive a multicast data packet;
   a searching unit configured to determine a multicast E-Channel Identification (ECID) and a cascade port associated with a multicast group of the multicast data packet, wherein the multicast ECID directs to egress ports in different VLANs of the multicast group on a port extender connected with the cascade port; and
   a transmitting unit configured to add an Extension VLAN Tag (ETAG) having the multicast ECID to the multicast data packet and transmit the multicast data packet with the ETAG having the multicast ECID via the cascade port.

5. The device according to claim 4, further comprising:
   an assigning unit configured to assign the multicast ECID for egress ports in different VLANs of the multicast group on the port extender; and
   a multicast duplication information generating unit configured to record that the multicast group is associated with the multicast ECID and the cascade port, obtain the egress ports in different VLANs of the multicast group on the port extender connected with the cascade port, and generate multicast duplication information, wherein the multicast duplication information contains a port identification and a VLAN identification of each egress port of the multicast group on the port extender; and
   a transmitting unit configured to transmit the multicast ECID and the multicast duplication information to the port extender via the cascade port.

6. The device according to claim 5, wherein
   the receiving unit is configured to receive a plurality of Internet Group Management Protocol (IGMP) membership report packets containing VLAN identifications and ETAGs and for joining the multicast group, via the cascade port; and
   the multicast duplication information generating unit is configured to identify each egress port based on an extended port indicated by a unicast ECID of the ETAG in each IGMP membership report packet, and identify a VLAN to which each egress port belongs based on the VLAN identification in each IGMP membership report packet.

7. A device for forwarding a multicast data packet, which is applied to a port extender of an extended bridge system, and the device comprising:
   a receiving unit configured to receive a multicast data packet containing an Extension VLAN Tag (ETAG) having a multicast E-Channel Identification (ECID) via an upstream port;
   a searching unit configured to search for multicast duplication information matching the multicast ECID, wherein the multicast duplication information contains a port identification and a VLAN identification of each egress port of a multicast group corresponding to the multicast data packet; and
   a transmitting unit configured to duplicate the multicast data packet for each egress port based on the multicast duplication information, remove the ETAG of each copy of the multicast data packet, add the VLAN identification of each egress port to each copy of the multicast data packet, and transmit the multicast data packet containing the VLAN identification via each egress port.

8. The device according to claim 7, wherein
   the receiving unit is configured to receive a plurality of Internet Group Management Protocol (IGMP) membership report packets for joining the multicast group via a plurality of extended ports, respectively; and the transmitting unit is configured to add an ETAG and a VLAN identification to each IGMP membership report packet based on a unicast ECID and a VLAN of each extended port receiving each IGMP membership report packet, and transmit each IGMP membership report packet with the ETAG and the VLAN identification via the upstream port.

9. The device according to claim 8, wherein
the receiving unit is configured to receive, via the upstream port, multicast ECID and multicast duplication information associated with the multicast ECID which are assigned by a controlling bridge in the extended bridge system; and
the searching unit is configured to record the received multicast ECID and multicast duplication information.

10. An extended bridge system comprising a controlling bridge and a plurality of port extenders, wherein
the controlling bridge comprises the device as claimed in claim 4; and
one of the port extenders is configured to:
receive a multicast data packet with the ETAG having the multicast ECID via an upstream port connected with the cascade port;
search for multicast duplication information matching the multicast ECID, wherein the multicast duplication information contains a port identification and a VLAN identification of each egress port of the multicast group;
duplicate the multicast data packet for each egress port based on the multicast duplication information, remove the ETAG of each copy of the multicast data packet, add the VLAN identification of each egress port to each copy of the multicast data packet, and transmit each copy of the multicast data packet containing the VLAN identification via each egress port.

11. A method of forwarding a multicast data packet, executed by the device as claimed in claim 7, comprising:
receiving a multicast data packet containing an Extension VLAN Tag (ETAG) having a multicast E-Channel Identification (ECID) via an upstream port;

searching for multicast duplication information matching the multicast ECID, wherein the multicast duplication information contains a port identification and a VLAN identification of each egress port of a multicast group corresponding to the multicast data packet; and
duplicating the multicast data packet for each egress port based on the multicast duplication information, removing the ETAG of each copy of the multicast data packet, adding the VLAN identification of each egress port to each copy of the multicast data packet, and transmitting the multicast data packet containing the VLAN identification via each egress port.

12. The method according to claim 11, wherein before receiving the multicast data packet containing the ETAG having the multicast ECID via the upstream port, the method comprises:
receiving a plurality of Internet Group Management Protocol (IGMP) membership report packets for joining the multicast group via a plurality of extended ports, respectively;
adding an ETAG and a VLAN identification to each IGMP membership report packet based on a unicast ECID and a VLAN of an extended port receiving each IGMP membership report packet; and
transmitting each IGMP membership report packet with the ETAG and the VLAN identification via the upstream port.

13. The method according to claim 12, wherein before receiving the multicast data packet containing the ETAG having the multicast ECID via the upstream port, the method comprises:
receiving the multicast ECID and the multicast duplication information associated with the multicast ECID which are assigned by a controlling bridge via the upstream port; and
recording the received multicast ECID and multicast duplication information.

\* \* \* \* \*